United States Patent
D'Annunzio et al.

(10) Patent No.: US 6,338,518 B1
(45) Date of Patent: Jan. 15, 2002

(54) REAR VEHICLE STORAGE SYSTEM

(75) Inventors: Gary J. D'Annunzio, Macomb Township; Patrick M. Murray, Southfield; Steven J. Allen, Oxford; Marilyn D. Vala, Rochester; Todd A. Mysliwiec, Allen Park; Vincent VanLierde, Farmington Hills; Jason P. Baldas, Warren, all of MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 09/514,672

(22) Filed: Feb. 28, 2000

Related U.S. Application Data

(60) Provisional application No. 60/121,990, filed on Feb. 27, 1999.

(51) Int. Cl.⁷ .................................................. B60N 3/12
(52) U.S. Cl. ................ 296/37.8; 296/37.14; 296/37.16; 296/24.1
(58) Field of Search .................. 296/37.8, 37.14, 296/37.16, 24.1

(56) References Cited

U.S. PATENT DOCUMENTS

| | | | |
|---|---|---|---|
| 4,108,487 A | * | 8/1978 | Spohn .......................... 296/28 |
| 4,443,034 A | * | 4/1984 | Beggs ...................... 296/37.16 |
| 4,469,364 A | * | 9/1984 | Rafi-Zadeh ................ 296/37.6 |
| 4,573,731 A | * | 3/1986 | Knaack et al. .............. 296/37.6 |
| 4,705,315 A | * | 11/1987 | Cherry ....................... 296/37.1 |
| 4,733,898 A | | 3/1988 | Williams |
| 4,752,095 A | | 6/1988 | Brady |
| 4,842,175 A | * | 6/1989 | Towsend .................... 296/37.8 |
| 4,889,377 A | * | 12/1989 | Hughes ...................... 296/24.1 |
| 4,915,437 A | | 4/1990 | Cherry |
| 4,946,215 A | | 8/1990 | Taylor |
| 4,969,678 A | * | 11/1990 | Loisel ........................ 296/24.1 |
| 4,971,234 A | * | 11/1990 | Hay ........................... 296/37.6 |
| 5,039,155 A | * | 8/1991 | Suman et al. ............. 296/37.15 |
| 5,137,321 A | * | 8/1992 | Landry et al. .............. 296/24.1 |
| 5,161,700 A | | 11/1992 | Stannis et al. |
| 5,167,433 A | | 12/1992 | Ryan |
| 5,184,931 A | | 2/1993 | Safko |
| 5,381,940 A | | 1/1995 | Wright |
| 5,419,476 A | | 5/1995 | White |
| 5,458,353 A | * | 10/1995 | Hanemaayer ............. 296/37.14 |
| 5,469,999 A | | 11/1995 | Phirippidis |
| 5,498,048 A | * | 3/1996 | Shelby ....................... 296/24.1 |
| 5,593,201 A | * | 1/1997 | Bateman .................... 296/24.1 |
| 5,634,408 A | | 6/1997 | Jarkowski |
| 5,669,537 A | | 9/1997 | Saleem et al. |
| 5,683,132 A | | 11/1997 | Danzo et al. |
| 5,823,598 A | * | 10/1998 | Clare et al. ................. 296/24.1 |
| 5,845,952 A | * | 12/1998 | Albertini et al. ........... 296/24.1 |
| 6,033,002 A | * | 3/2000 | Clare et al. ................. 296/37.6 |
| 6,155,625 A | * | 12/2000 | Felix ........................ 296/37.14 |

FOREIGN PATENT DOCUMENTS

GB 2 047 635 * 2/1980

* cited by examiner

Primary Examiner—Joseph D. Pape
Assistant Examiner—Kiran B. Patel
(74) Attorney, Agent, or Firm—Brooks & Kushman P.C.

(57) ABSTRACT

A storage system is provided for the rear storage compartment of a vehicle. The storage system may include a collapsible cart that is received in tracks in a load floor. Other types of objects may be stored on the load floor or in compartments below the load floor. Compartments may be provided below the load floor on a tray having multiple compartments that is rotatable within a well formed under the load floor. A frame for storing removable trays, bins or the collapsible cart may be used to store objects above the load floor.

5 Claims, 13 Drawing Sheets

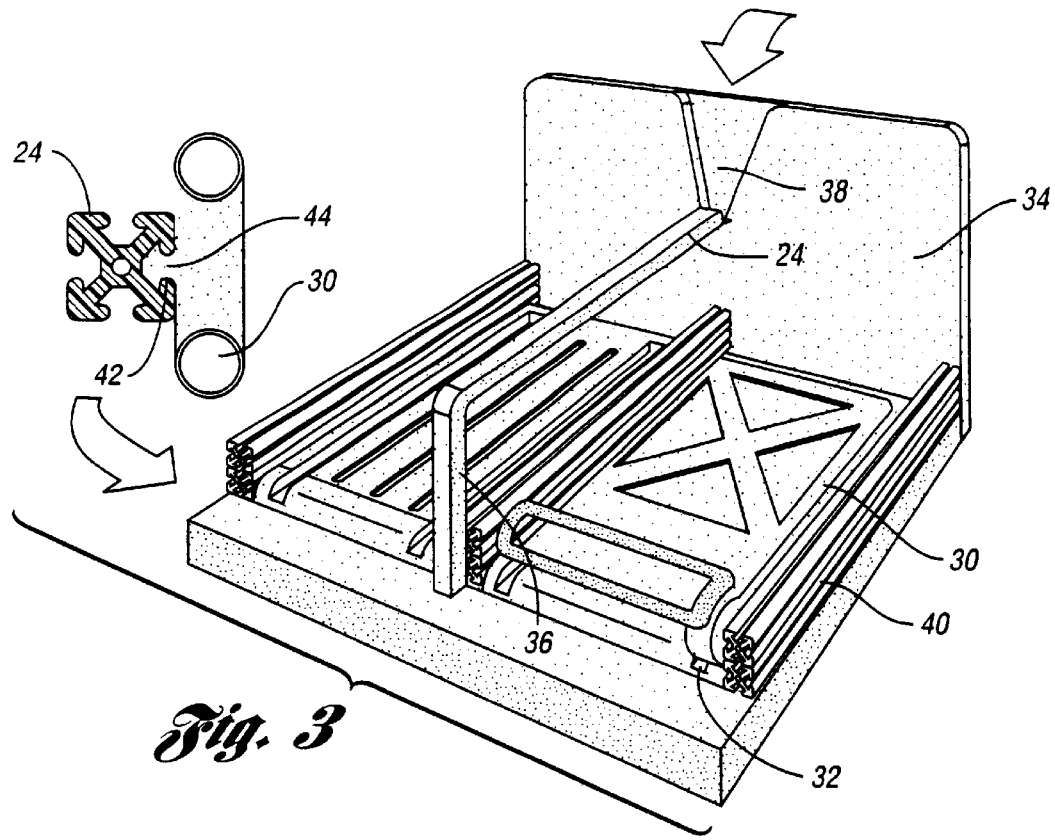
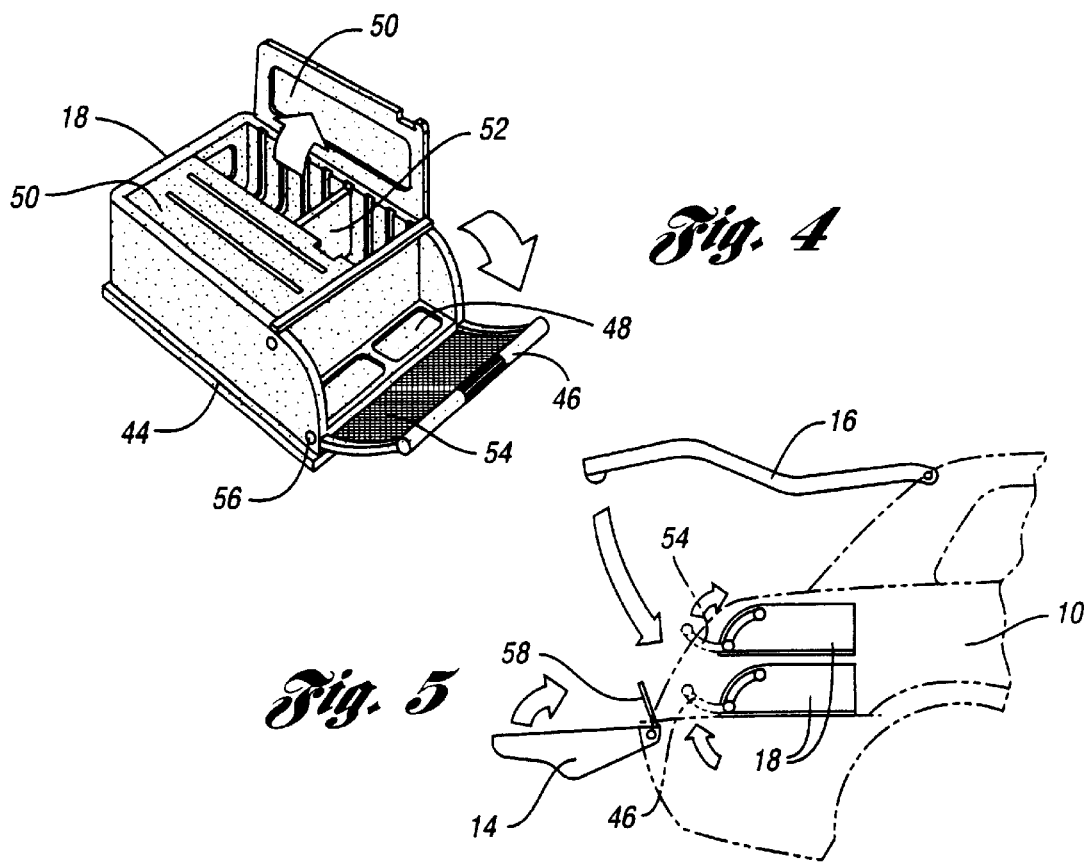

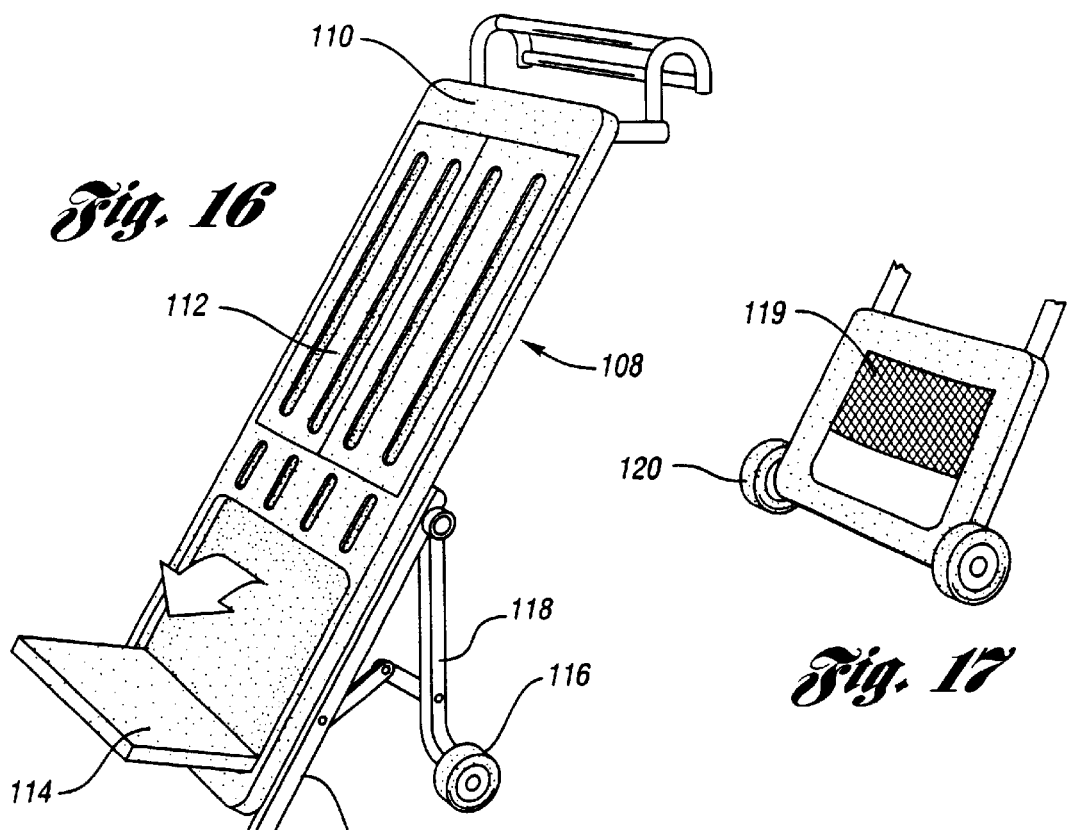
*Fig. 16*
*Fig. 17*
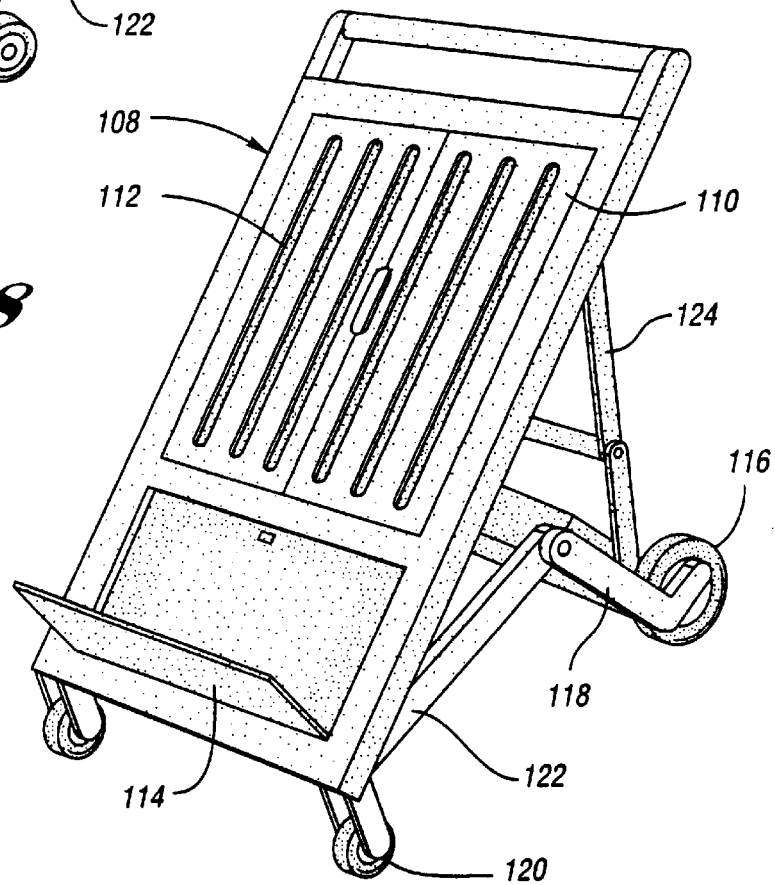
*Fig. 18*

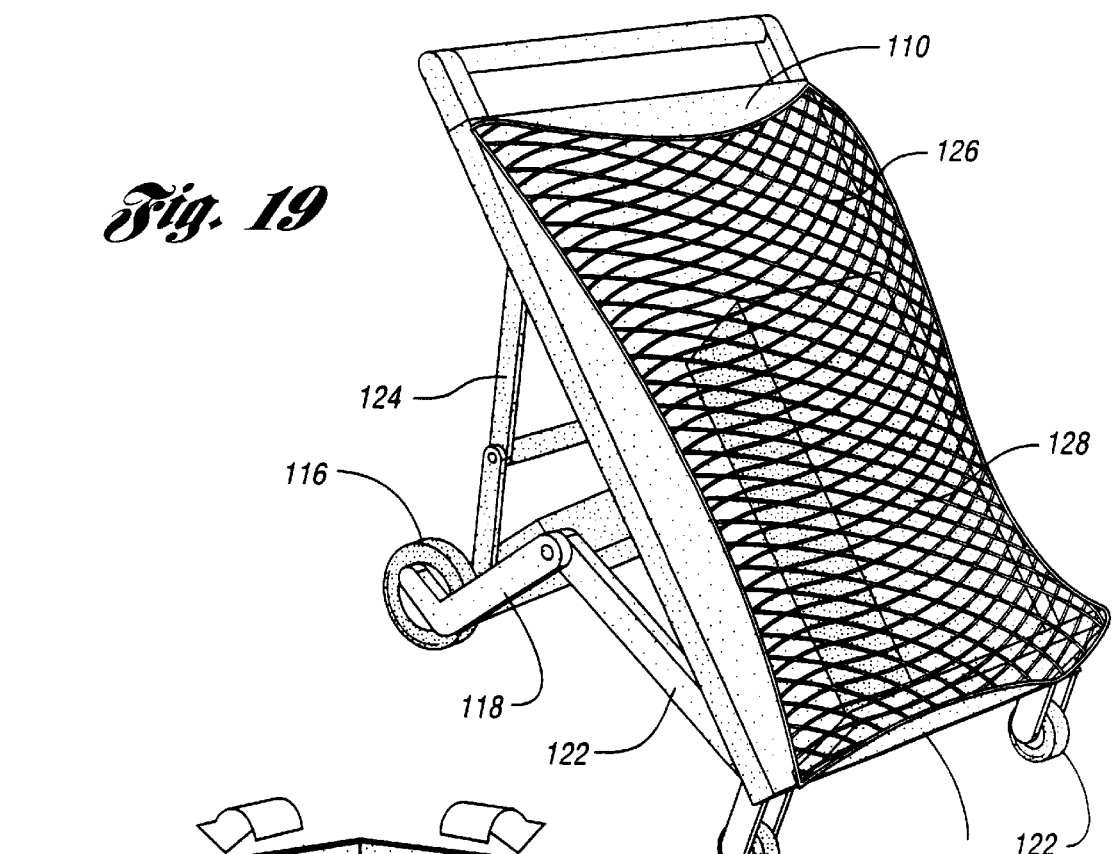
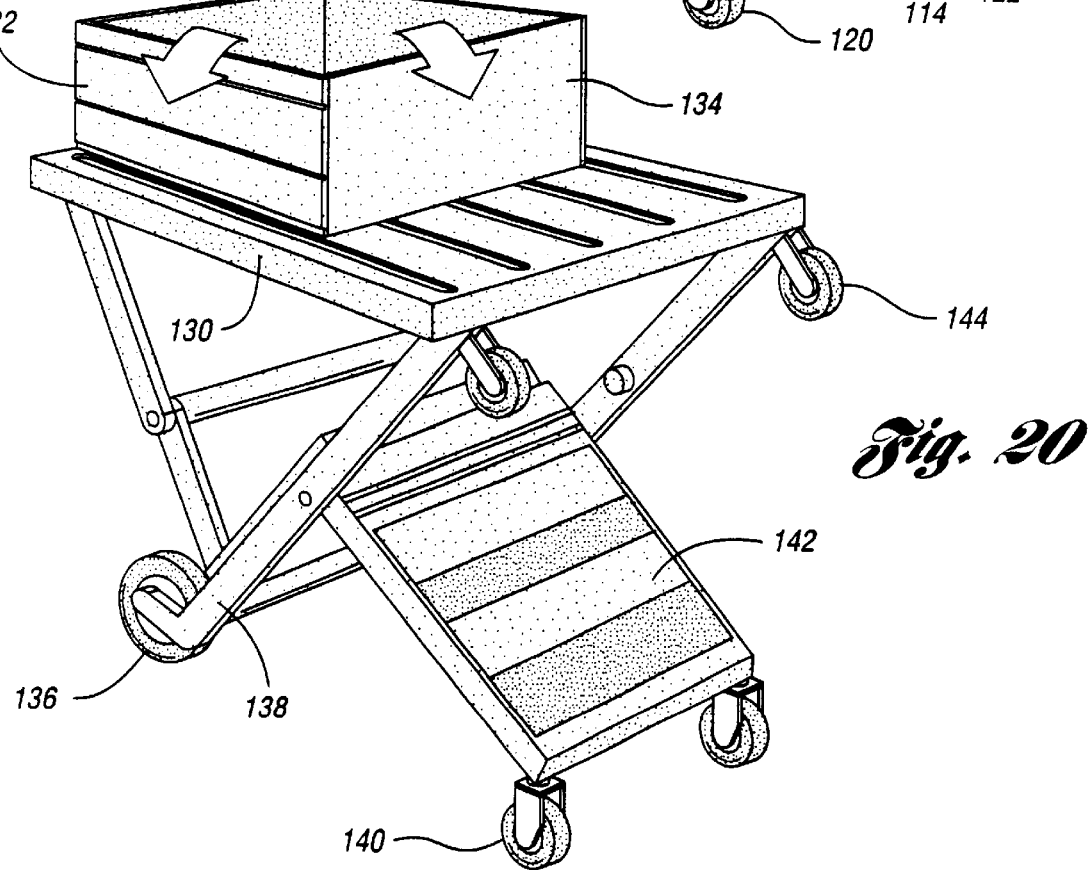

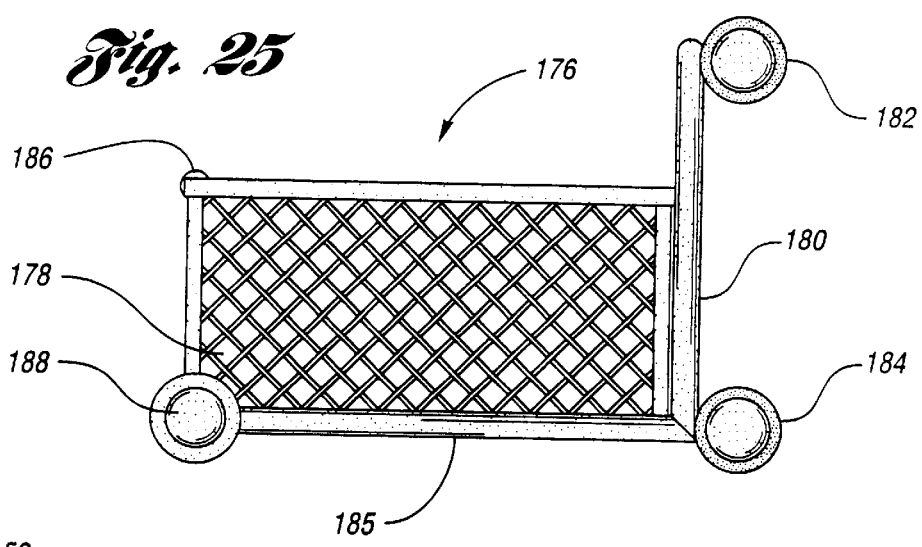
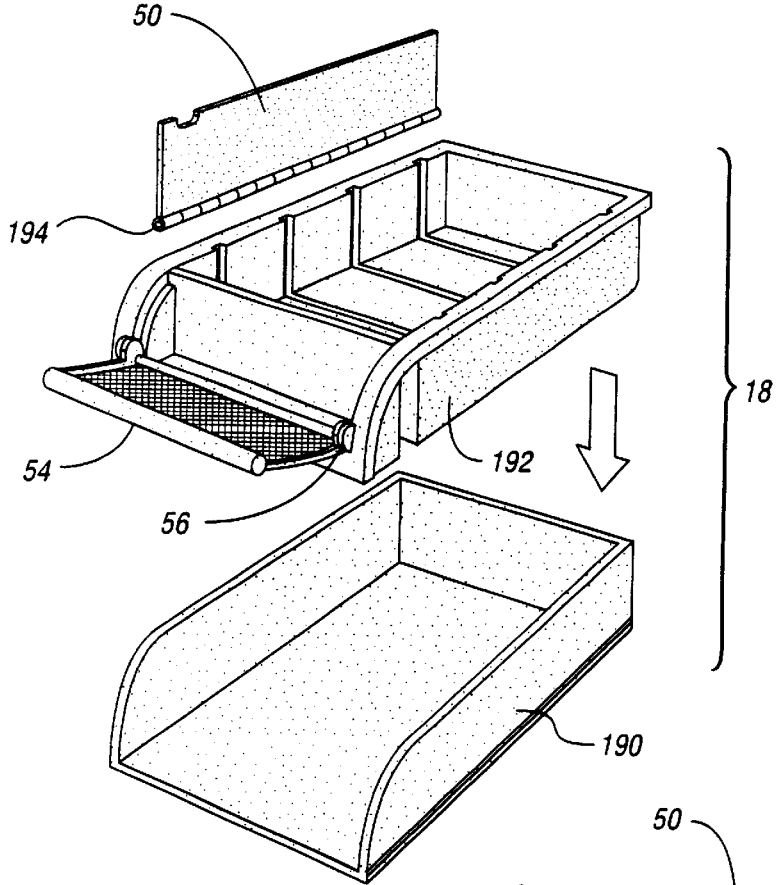
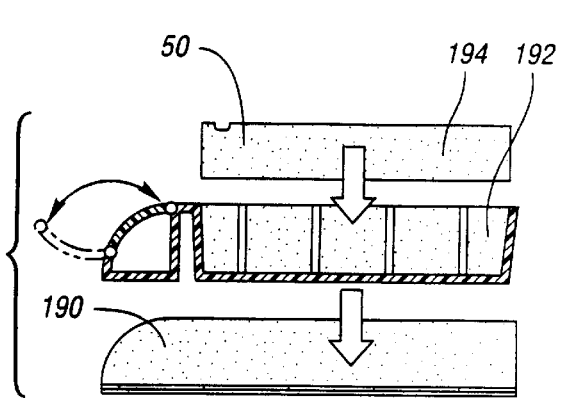

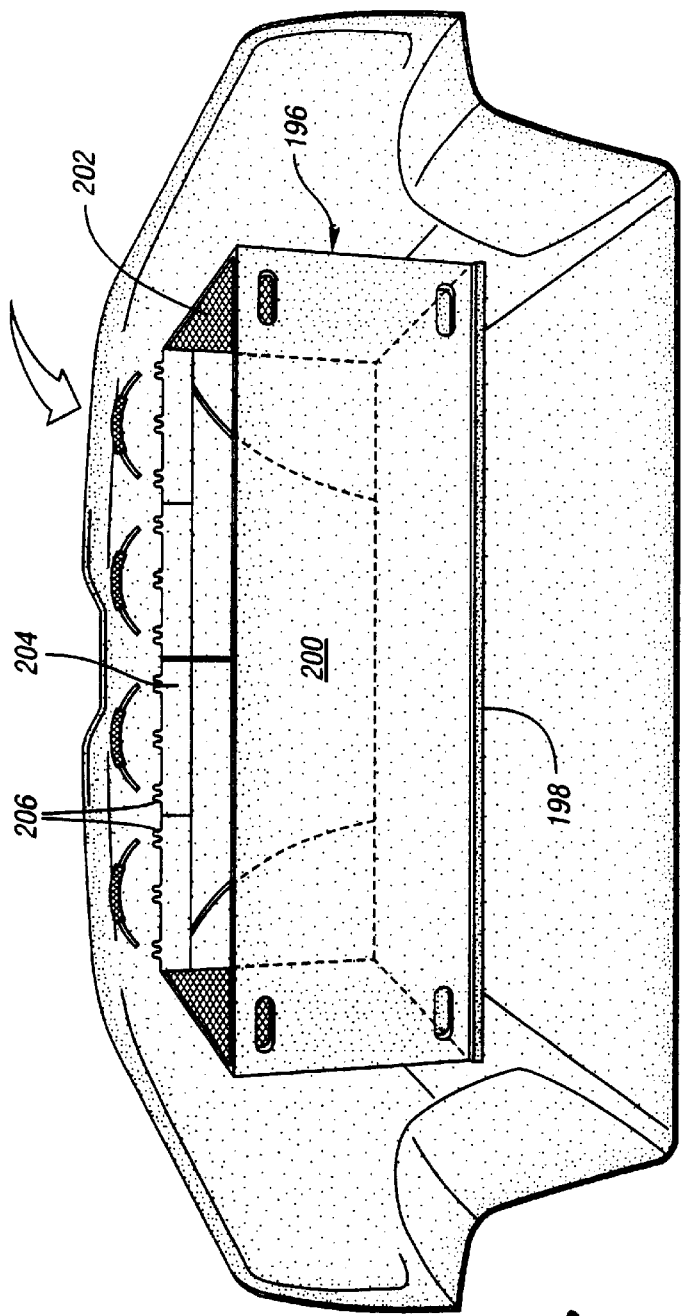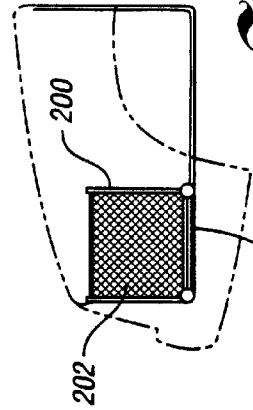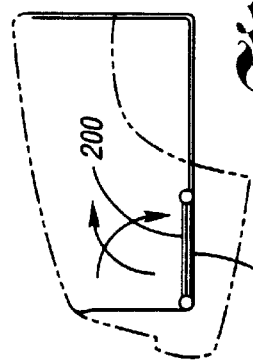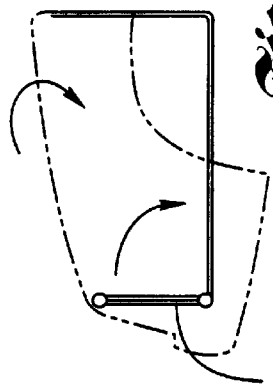

REAR VEHICLE STORAGE SYSTEM

This application claims the benefit of U.S. provisional application Ser. No. 60/121,990 filed Feb. 27, 1999.

TECHNICAL FIELD

This invention relates to rear compartment storage for sport utility vehicles, minivans, vans, automobiles, trucks and the like.

BACKGROUND ART

The rear cargo area of many vehicles provides a large volume of space that is used to haul luggage, groceries, sporting equipment and the like. While a large volume of space is advantageous with some types of cargo, more effective space utilization could be achieved by compartmentalizing the available space. Space below the load floor of the vehicle is generally not usable for day-to-day storage. The sub-cargo floor storage of spare tires which is known, however the cargo floor covering a spare tire is not designed for ease of removal.

The storage space in the rear of vehicles is difficult to fully utilize. The large volume of space above the floor of the storage space is difficult to access making it inconvenient to store and retrieve objects. Much of the space above the load floor is not useable unless the objects stored are stacked on other objects.

Load carrying carts may be used to transport objects. The prior art does not disclose or suggest the concept of providing a manually operated cart or load moving device that can be easily stored in the rear storage area of a sport utility vehicle or minivan. A collapsible multipurpose cart that can be set up for use in transporting cargo to and from the vehicle is not known to be available in the prior art.

These and other problems and disadvantages relating to prior art storage systems are addressed by the present invention.

DISCLOSURE OF INVENTION

According to the present invention, a vehicle storage system is provided for a vehicle storage compartment that defines a space for storing a variety of different articles. The storage compartment may include a load floor formed in one or more sections. The system includes providing a collapsible cart that is received on the load floor that includes tracks for guiding movement of the collapsible cart into and out of the rear storage area. The collapsible cart has a plurality of wheels connected to a frame that is convertible between a collapsed position and an expanded position.

According to another aspect of the invention, a vehicle storage system is provided for a vehicle storage compartment that defines specialized storage compartments for storing a variety of articles. A load floor formed in one or more sections is provided that covers a vehicle storage compartment including a storage well. A tray is contained in the storage well and has a plurality of compartments. A pivot connection between the storage well and the tray permits the tray to rotate within the well to facilitate access to any of the compartments.

According to another aspect of the invention, a vehicle storage system is provided in which a vehicle storage compartment defines a space for storing a variety of different articles and has a load floor that is formed in one or more sections. A frame formed of vertically oriented support rails, horizontal lateral rails and horizontal longitudinal rails is adapted to receive one or more storage modules either on the load floor or supported above the load floor on the frame. The storage module may be a collapsible cart, a removable tray, a bin, a dolly, a step ladder, or a portable seat.

These and other objects and advantages of the present invention will be better understood in view of the attached drawings and following detailed description of various embodiments of the invention.

BRIEF DESCRIPTION OF DRAWINGS

FIG. 3 is a rear perspective view of the vehicle storage system including a cart and support frame.

FIG. 4 is a rear perspective view of a bin for use in conjunction with the storage system of the present invention.

FIG. 5 is a side diagrammatic view showing the vehicle storage system of the present invention including two rear opening bins with the tailgate and liftgate of the vehicle shown in their open position.

FIG. 16 is a side perspective view of a collapsible cart in a dolly mode.

FIG. 17 is a partial perspective view of the dolly shown in FIG. 16 with a net storage area on the rear of the cart.

FIG. 18 is a side perspective view of a collapsible cart in a dolly mode.

FIG. 19 is a perspective view of a collapsible dolly having a net retainer.

FIG. 20 is a perspective view of a collapsible cart having a collapsible bin on the top surface thereof.

FIG. 25 is a side view of a collapsible cart in a low profile configuration.

FIG. 26 is an exploded perspective view of a two-tiered bin storage device.

FIG. 27 is a side elevation view of the two-tiered bin embodiment shown in FIG. 26.

FIG. 28 is a front perspective view of a collapsible storage module for a vehicle trunk area.

FIG. 29 is a side diagrammatic view of the storage device shown in FIG. 28 in its folded position.

FIG. 30 is a side diagrammatic view of the storage device shown in FIG. 28 in its partially assembled position.

FIG. 31 is a side diagrammatic view of the storage device shown in FIG. 28 in its assembled position with nets for retaining articles spanning the storage device.

BEST MODE FOR CARRYING OUT THE INVENTION

Figure 1:
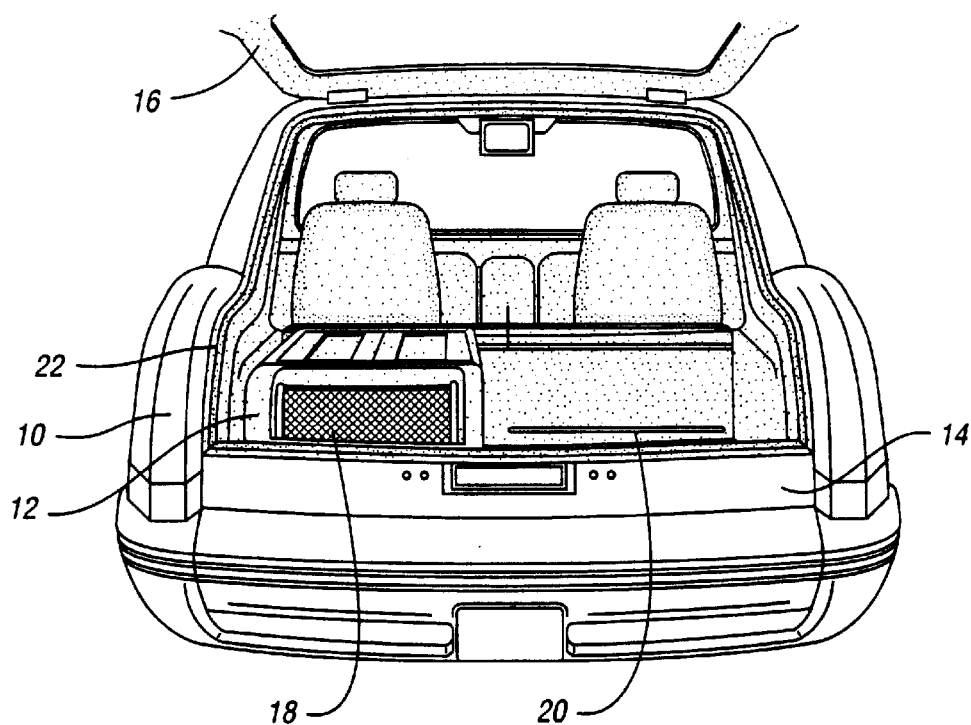
FIG. 1 is a perspective view of the rear storage area of a vehicle including the vehicle storage system of the present invention.

Referring now to FIG. 1, a vehicle 10 is provided with a storage system 12 made in accordance with the present invention. The storage system 12 is accessible by opening the tailgate 14 and/or liftgate 16 of the vehicle 10. As shown in FIG. 1, a storage bin 18 is provided on a load floor 20 that defines the bottom of the vehicle storage compartment 22.

Figure 2:
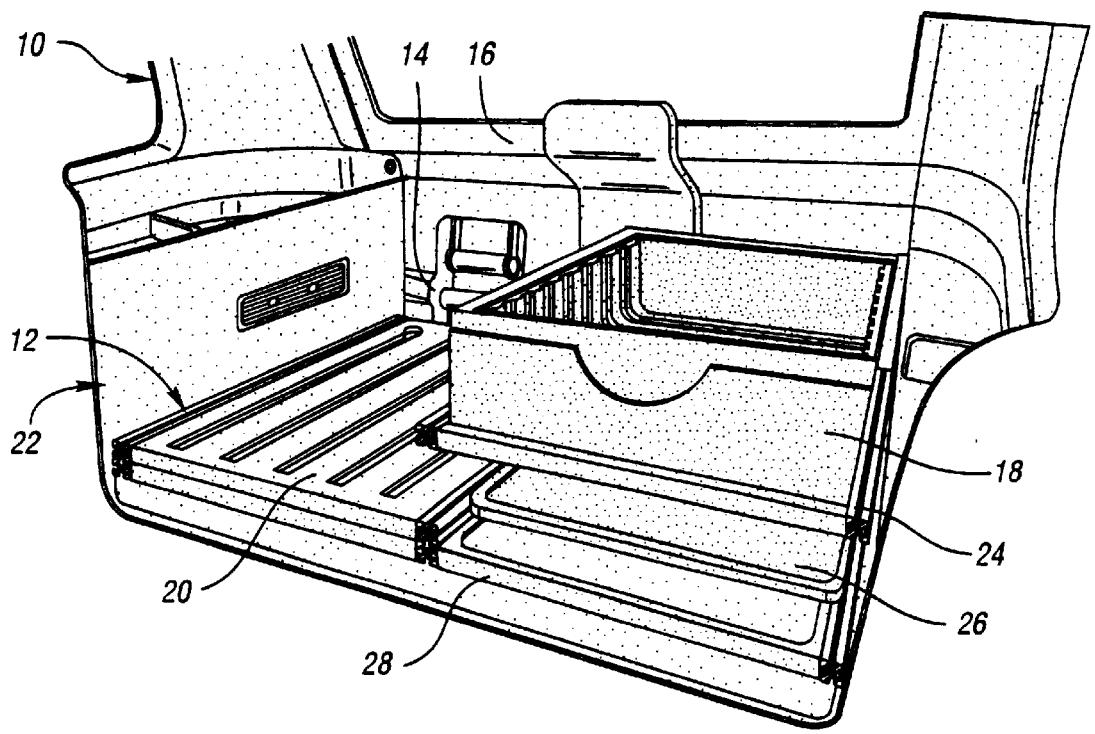
FIG. 2 is a front perspective view of the vehicle storage system of the present invention installed in a vehicle with the lift gate closed.

Referring now to FIG. 2, the vehicle storage compartment 22 is shown from the front with the tailgate 14 and liftgate 16 closed. The storage compartment 22 has a load floor 20. Longitudinal rails 24 extend longitudinally through the storage compartment 22 to support a tray 26 or bin 18 as shown in FIG. 2. A vertically extending frame member 28 is provided to support the tray 26 and bin 18.

Referring now to FIG. 3, storage system 12 is shown to include the load floor 20 and a collapsible cart 30. The collapsible cart 30 is guided for insertion onto the load floor 20 by means of grooves 32 in the load floor 20. A forward wall 34 and vertical rails 36 are used to support longitudinal rail 24 which is centrally mounted and extends between the vertical rail 36 and a groove 38 formed in the forward wall 34.

Referring to the enlarged view portion of FIG. 3, the cart 30 is secured within the storage system 12 by means of slots 42 formed in the longitudinal rails 24, 24' to receive a rib 44 formed on the frame of the cart 30.

Referring now to FIG. 4, a bin 18 has a handle 46 that is grasped to provide access to a rear compartment 48 of the bin 18. The bin 18 is provided with lid panels 50 that are hingedly connected to the sides of the bin 18. Dividers 52 may be provided in the bin to separate different sections of the bin 18. The rear compartment 48 of the bin 18 is covered by a net cover 54 that is connected by a hinge 56 to the lower portion of the bin 18.

Referring now to FIG. 5, the vehicle 10 is partially shown that includes a liftgate 16 and tailgate 14, both in their open position. A pair of bins 18 are provided in a stacked arrangement within the storage compartment 22. The bins 18 have net covers 54 and handles 46 as described previously. A flap 58 is provided between the tailgate 14 and the load floor (not shown) to bridge the gap between the load floor and the tailgate 14 when the tailgate 14 is opened.

Figure 6:
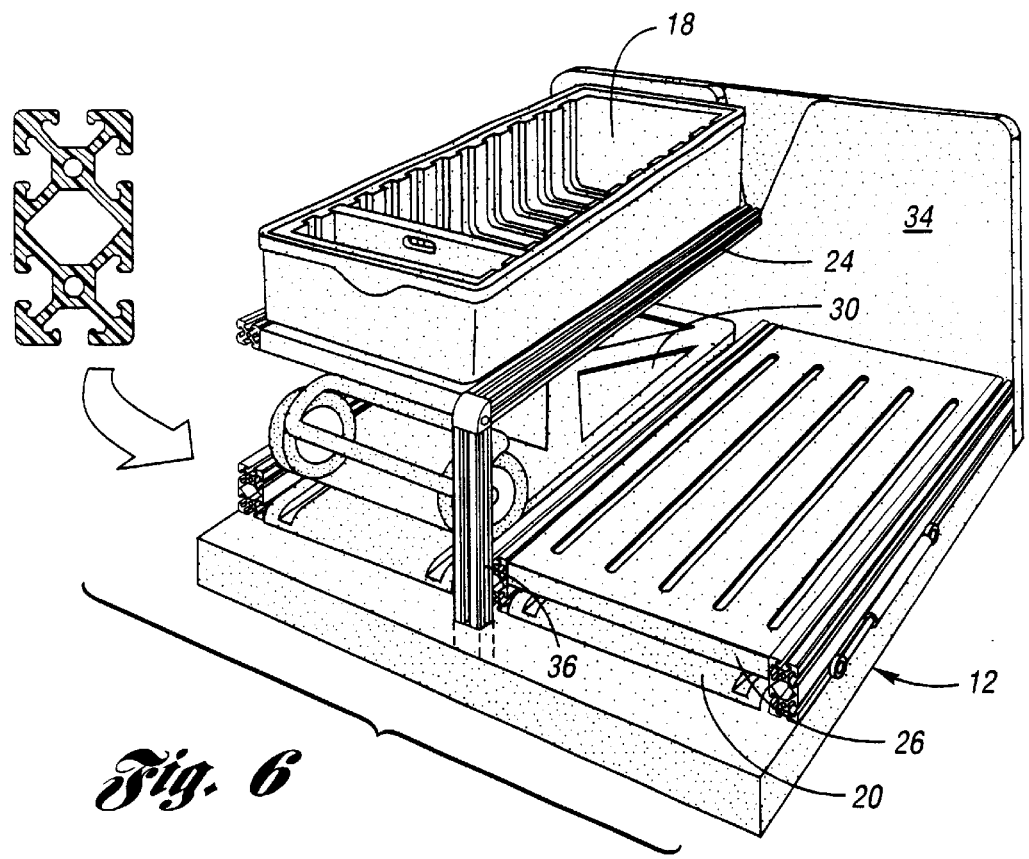
FIG. 6 is a rear perspective view of the vehicle storage system of the present invention including a lazy susan covered by a two-part load floor and including a load floor, a cart, and storage bin.

Referring now to FIG. 6, the storage system 12 is shown in a different arrangement wherein a bin 18 is retained on a frame 28 including longitudinal rail 24 beneath the bin 18 and a storage cart 30 is collapsed and placed on the load floor 20. The load floor 20 is formed in two parts with a tray 26 covering one part of the load floor 20.

Figure 7:
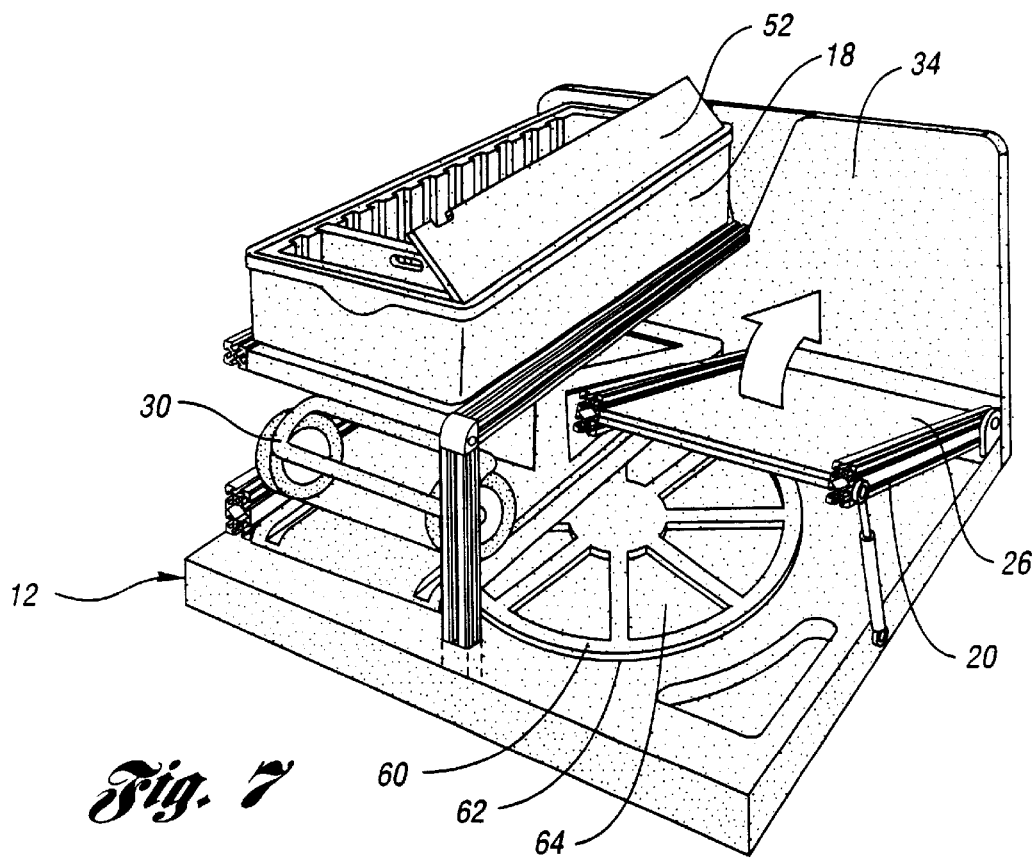
FIG. 7 is a rear perspective view of the vehicle storage system as shown in FIG. 6 with the load floor partially opened to show the lazy susan.

As shown in FIG. 7, the load floor 20 in this embodiment covers a lazy susan 60 in a well 62 beneath the load floor 20. The lazy susan 60 is pivotally mounted within the well 62 so that small articles may be placed in compartments 64 of the lazy susan. When it is desirable to reach an object contained within a compartment 64 of the lazy susan 60, the lazy susan is rotated so that the article is as close as possible to the rear of the load floor 20 to aid in lifting and accessibility.

Figure 8:
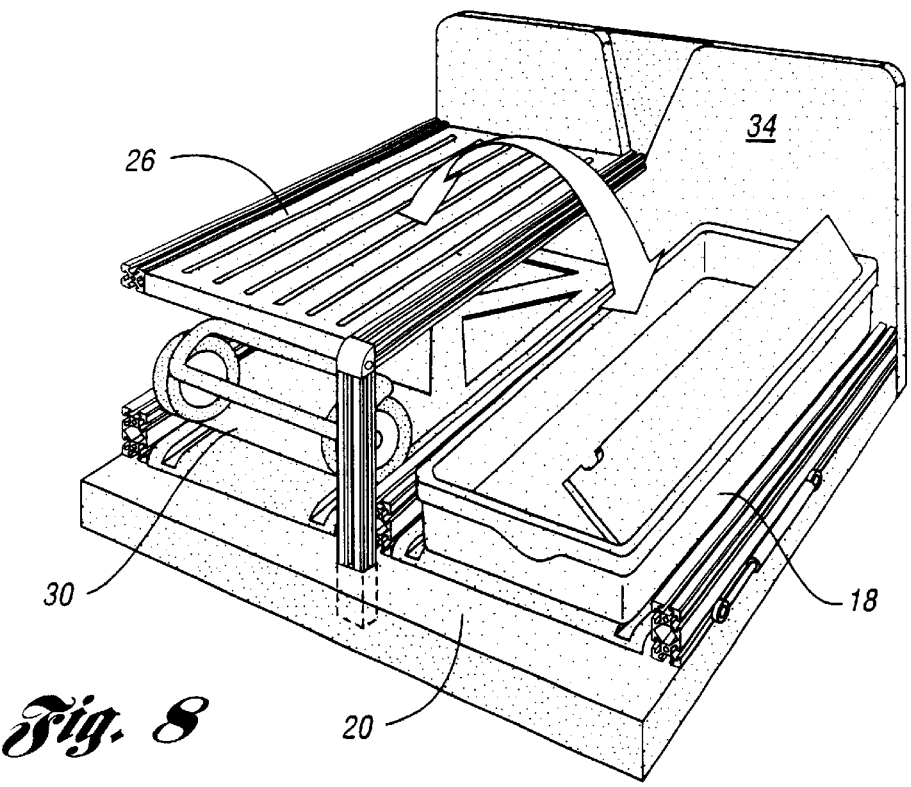
FIG. 8 is a rear perspective view of the vehicle storage system shown in FIG. 7 with the bin interchanged to a load floor location.

Referring now to FIG. 8, the bin 18 and tray 26 are shown to be interchanged relative to the arrangement illustrated in FIG. 6 with the tray 26 being placed on the frame 28 and the bin 18 being placed on the load floor 20.

Figure 9:
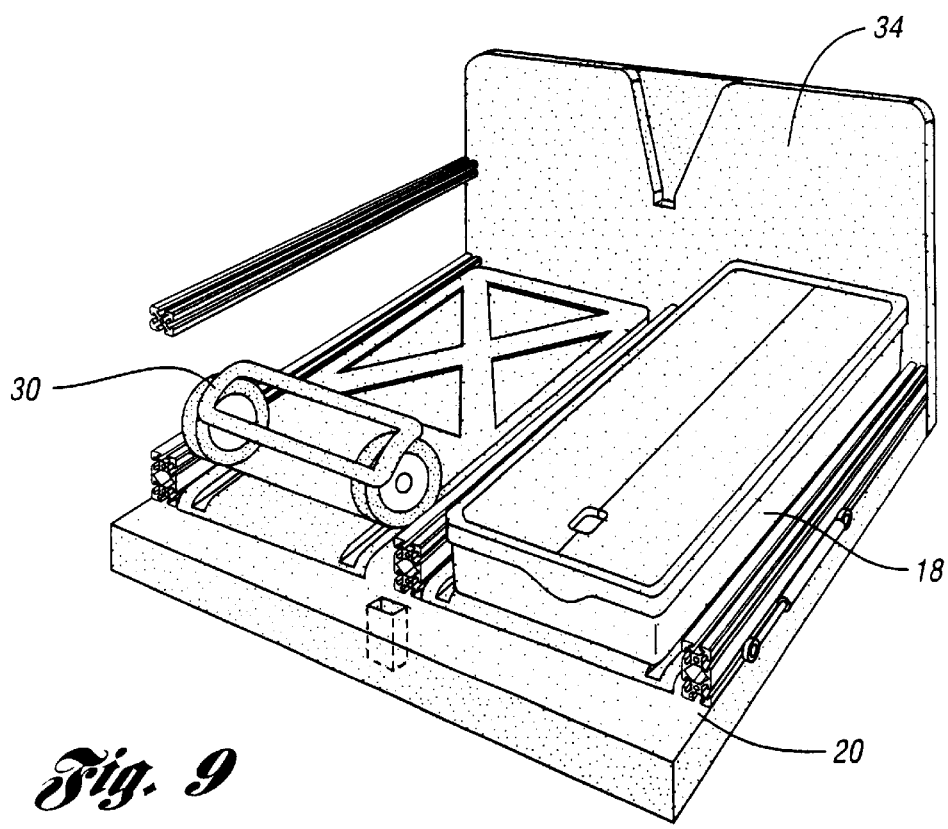
FIG. 9 is a rear perspective view of the vehicle storage system shown in FIG. 6 with the frame removed.

Referring now to FIG. 9, another arrangement is shown wherein the center longitudinal rail 24 has been removed and the bin 18 and cart 30 are placed side-by-side on the load floor 20.

Figure 10:
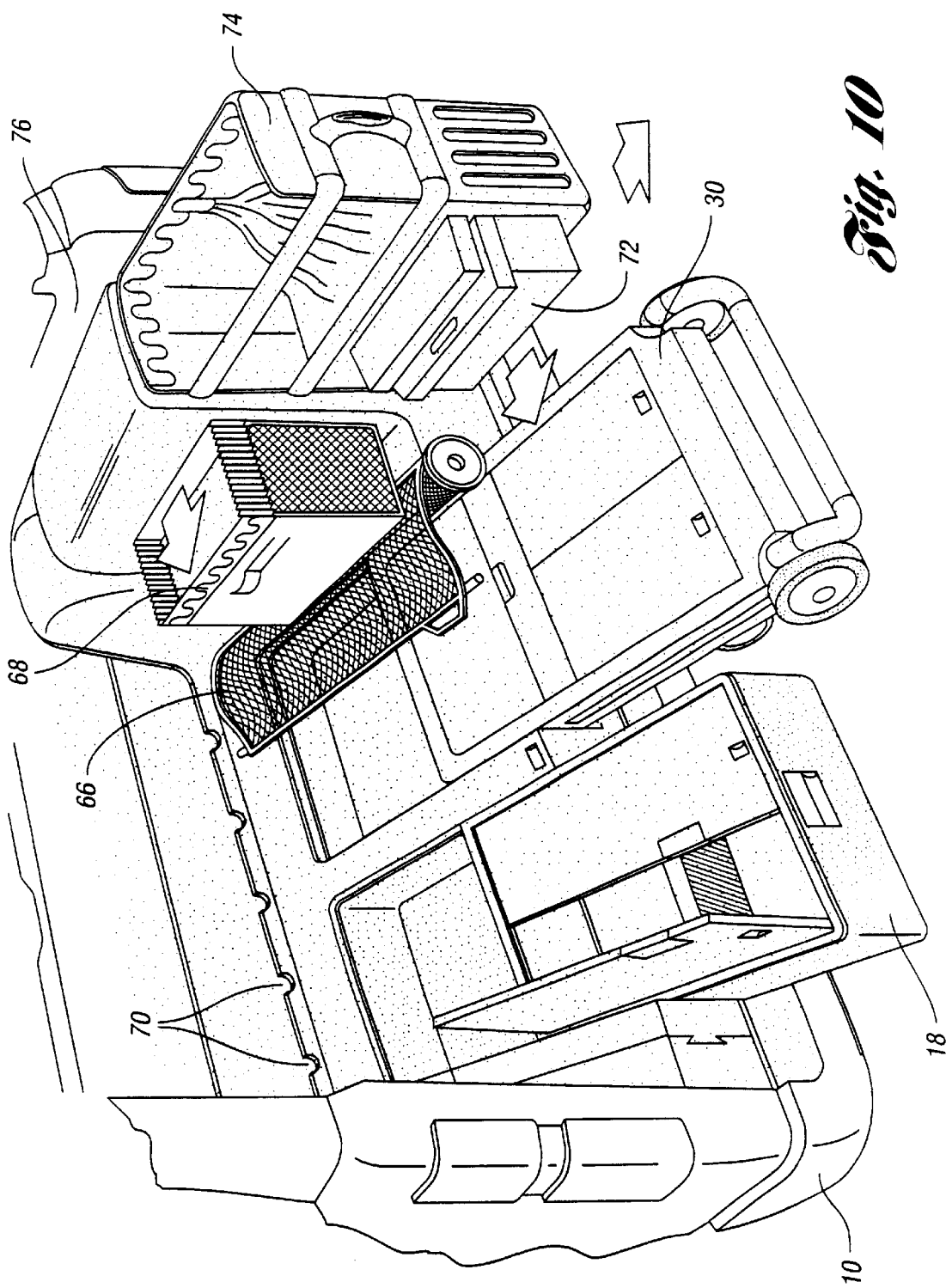
FIG. 10 is a rear perspective view showing the vehicle storage system of the present invention with pullout side storage components.

Referring now to FIG. 10, another arrangement of the storage system 12 of the present invention is shown wherein a bin 18 and cart 30 are provided and, in addition, a roll away net 66 is provided on a spool 67 on one side of the storage compartment 22. A pull out net bag 68 is shown above the roll away net 66. The roll away net 66 may be locked in position by means of notches 70. A cooler 72 is also provided as part of a pull out drawer unit 74 that is mounted to the side wall 76 of the vehicle 10.

Referring now to FIGS. 11–25, various is embodiments and arrangements or configurations of a collapsible storage cart are shown.

Referring specifically to FIG. 11–15, one embodiment of the collapsible cart is shown. The cart 30 includes a platform 80 hand a handle 82 at one end that is used for pushing the cart 30 and removing the cart 30 from the storage compartment 22. The side walls 84 and transverse walls 86 are hinged to the platform 80 so that they may be collapsed to form a flat surface platform 80 or extended to form a bin 18' on the top surface of the platform 80. Rear wheels 88 are connected by means of legs 90 to the front end of the platform 80. Support arms 92 are locked into place to hold the rear of the platform 80 above the rear wheels 88. The front wheels 94 are retained by means of a support frame 96 that is a generally rectangular shaped member having a net 98 provided for storing small articles. Intermediate wheels 100 are formed on the support frame 96 to assist in sliding the collapsible cart 30 into and out of the storage compartment 22. A reinforcement shaft 102 may be provided between the two support arms 92 to provide additional rigidity. A cross member 104 can also be provided between the legs 90 to further stabilize the collapsible cart construction. Platform wheels 106 may be provided adjacent the lower portion of the platform 80.

Figure 11:
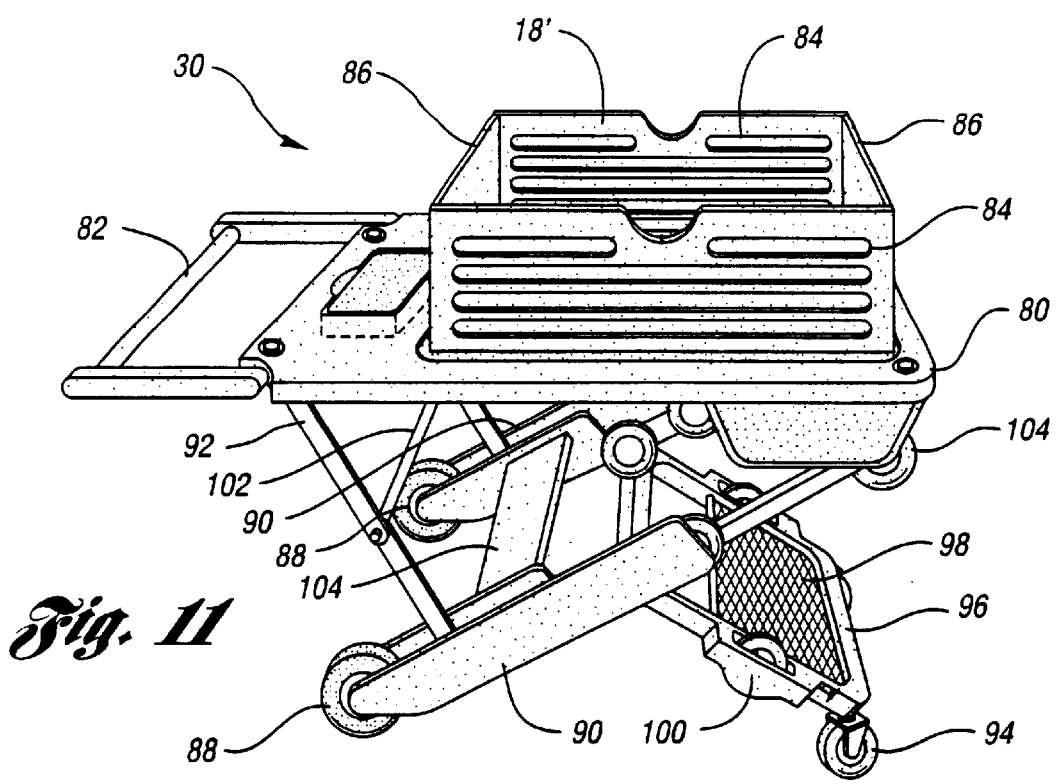
FIG. 11 is a side perspective view of a collapsible cart made in accordance with the present invention.
Figure 12:
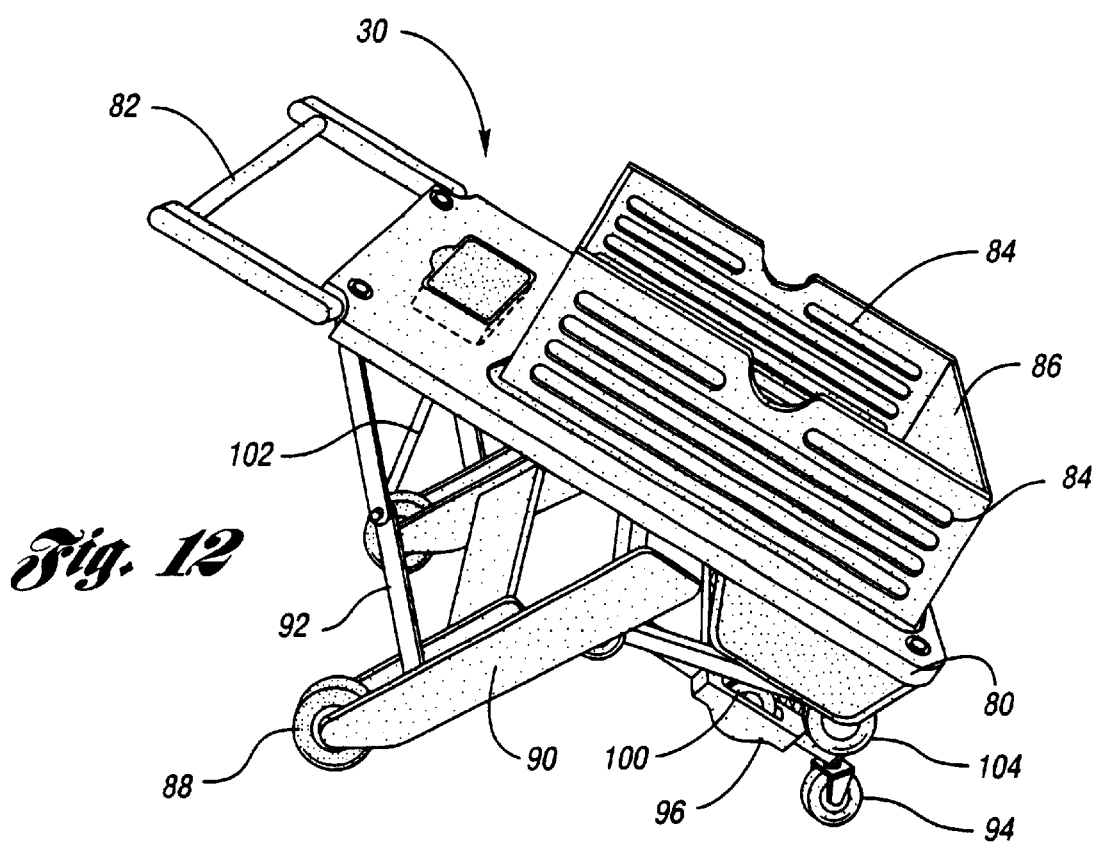
FIG. 12 is a side perspective view of a slanted top collapsible cart made in accordance with the present invention.

Referring now to FIG. 12, the collapsible cart 30 shown in FIG. 11 is shown in a different configuration wherein the front wheels 94 and frame 96 are not extended downwardly but are retained adjacent the bottom of the platform 80 to provide a tilted tote-type cart.

Figure 13:
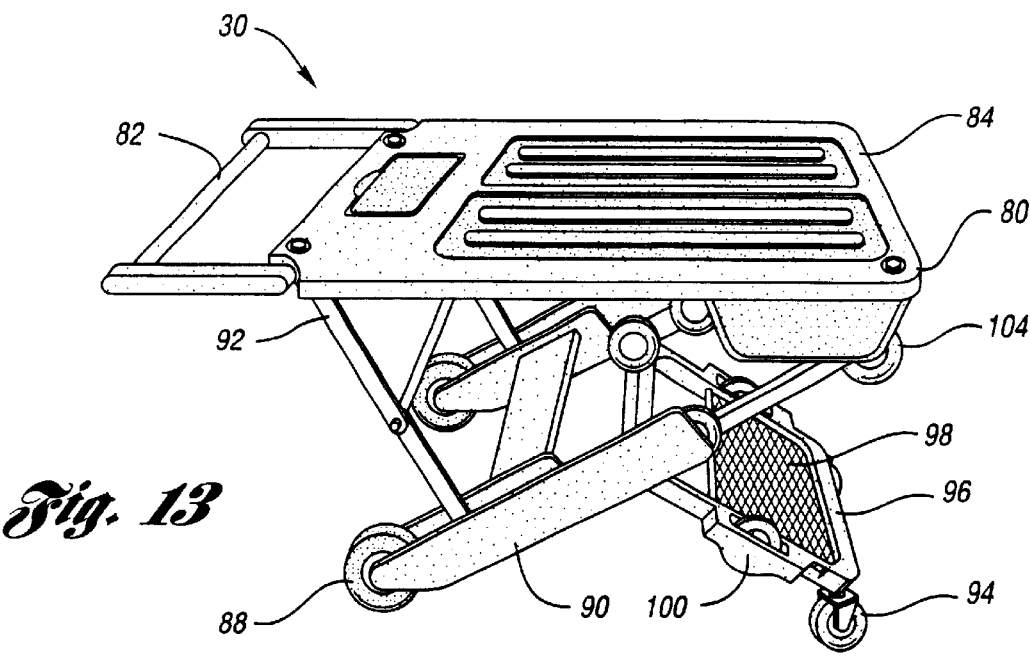
FIG. 13 is a side perspective view of a collapsible cart with a storage bin and front net storage area made in accordance with the present invention.
Figure 14:
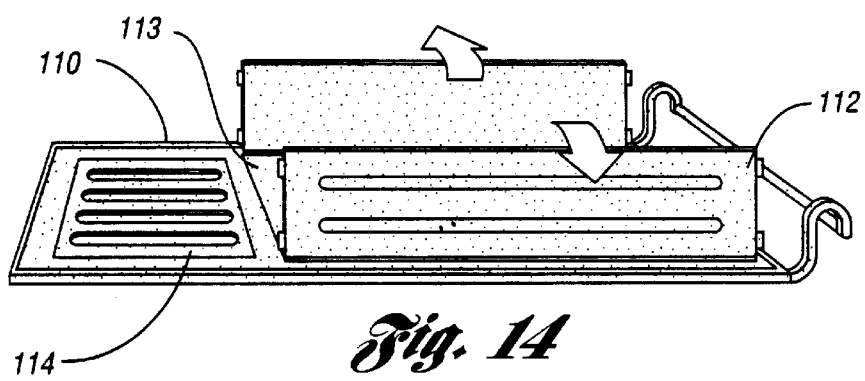
FIG. 14 is a side view of the top portion of a collapsible storage cart with the side walls raised.
Figure 15:
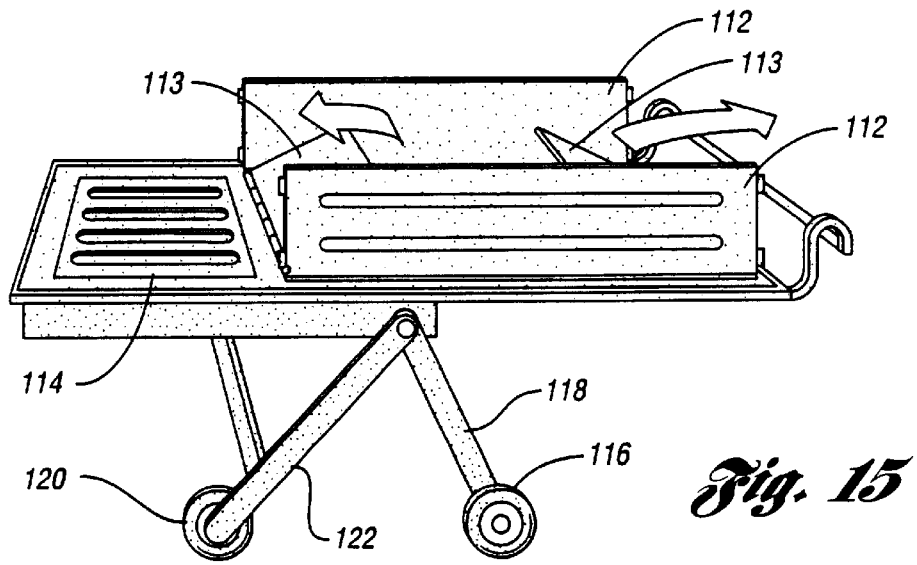
FIG. 15 is a side view of a collapsible storage cart with the side walls and front and rear walls of a collapsible bin partially assembled.

Referring now to FIG. 13, a collapsible cart 30 is shown wherein the platform 80 is used as a flat top cart with the side walls 84 folded down flush to the surface of the platform 80. The front wheels 94 and rear wheels 88 are deployed in the same manner as described with reference to FIG. 11.

Referring now more specifically to FIGS. 14–19, a multi-purpose dolly/cart 108 is shown in various configurations. The multipurpose cart 108 includes a deck 110 that has two hinged side walls 112 and transverse walls 113 that are folded up to create a bin on the top deck 110. A base panel 114 is also secured to the deck 110.

As shown in FIG. 16, the base panel may be folded down to provide a dolly-type of construction with the base panel 114 forming the bottom for retaining articles on the dolly that is generally held in the angled orientation.

As shown in FIG. 17, the rear of the dolly may include a storage net 119 that is supported on the lower side of the deck 110. The rear wheels 116 are supported on rear legs 118 that share a common pivot point with the front legs 122 that support the front wheels 120.

Referring now to FIG. 18, the multi-purpose dolly/cart 108 is shown with the deck 110 having side walls 112 folded down and the base panel 114 folded out. The rear wheels 116 are supported on rear legs 124 while front wheels 120 are attached to the deck 110. Support links 118 and 122 spread the rear wheels 116 relative to front wheels 120. The support links 118 and 122 are held in position by means of supports 124.

Referring now to FIG. 19, the dolly generally shown in FIG. 18 is additionally provided with a net 126 for retaining an article 128 securely on the deck 110 and the base panel 114.

Figure 21:
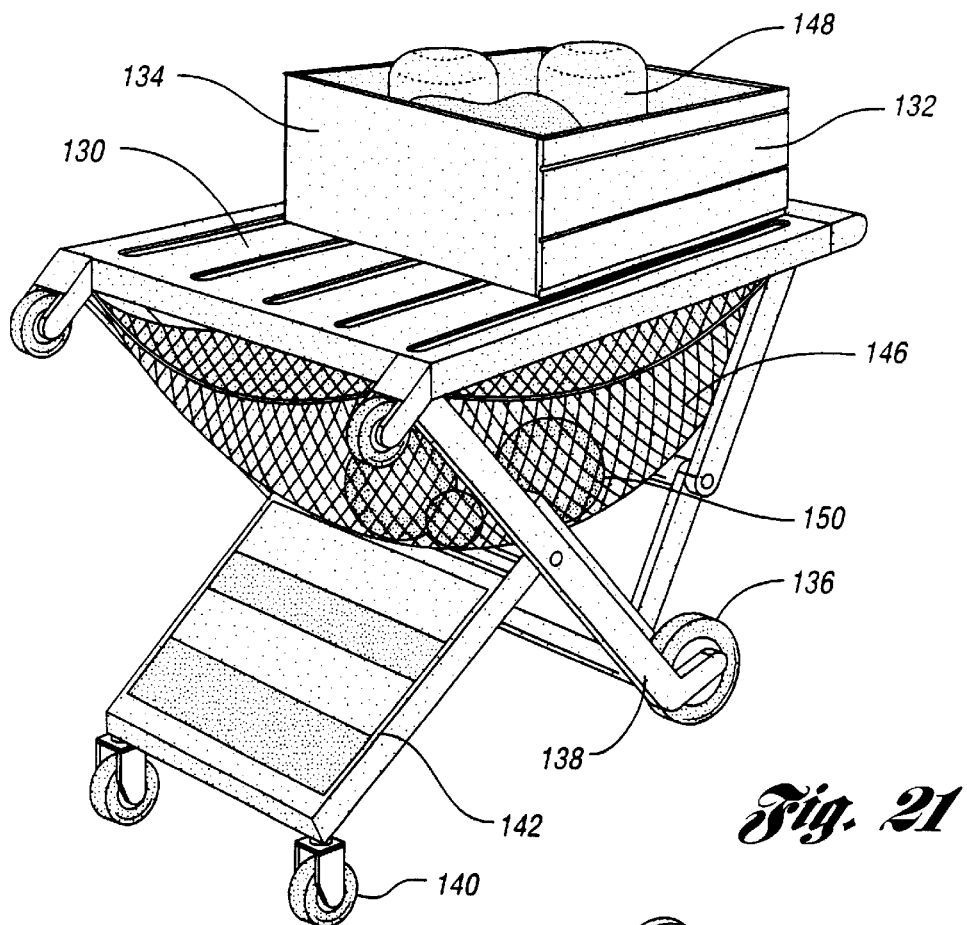
FIG. 21 is a perspective view of a collapsible cart having a collapsible bin and suspended net storage area.

Referring now to FIGS. 20 and 21, the simplified collapsible cart 30 is provided in which a deck 130 has a bin that may be formed by sidewalls 132 and transverse walls 134 as previously described. Rear wheels 136 are connected to legs 138 and front wheels 140 are connected to a plate 142. The forward end of the deck 130 includes deck wheels 144. A net 146 is slung from the bottom of the deck 130 so that objects 148 may be stored in the bin formed by side walls 132 and transverse walls 134 on top of the deck 130 while other objects 150 are stored in the net 146.

Figure 22:
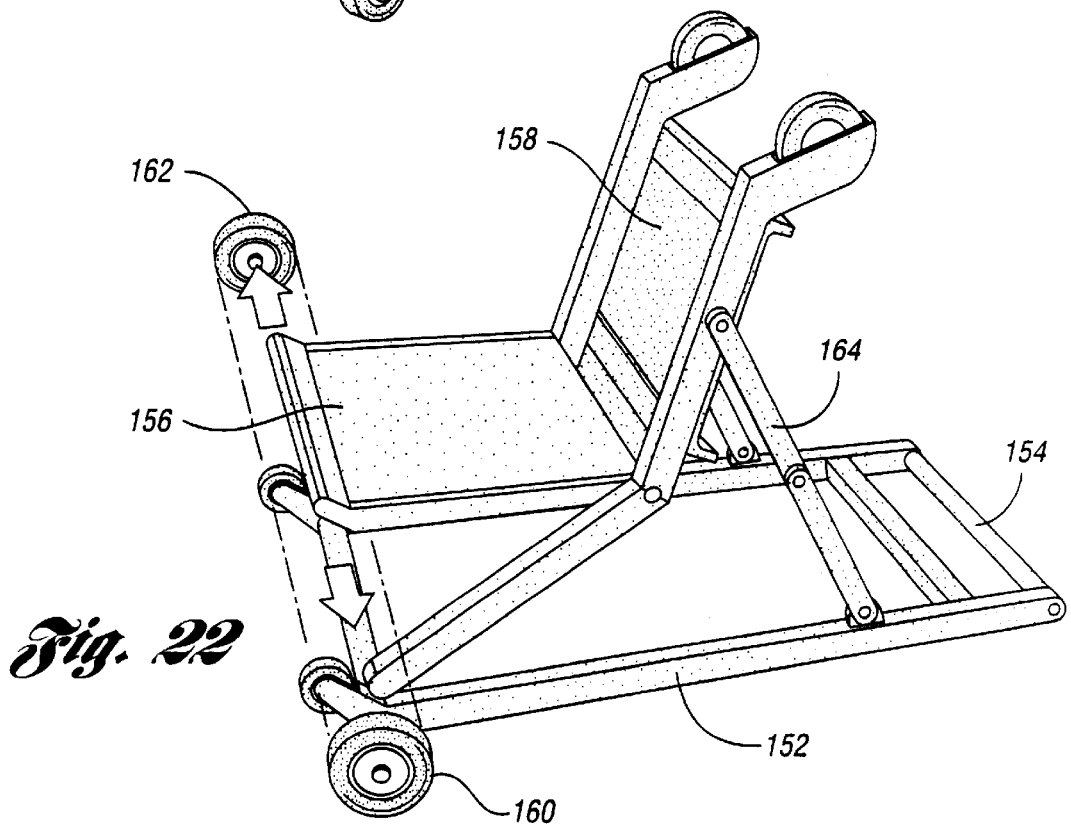
FIG. 22 is a perspective view of a collapsible cart that is folded into a portable seat configuration.

Referring now to FIG. 22, another collapsible cart is shown that may be configured as a portable seat. A frame 152 having a handle 154 at one end forms a base for a seat 156 having a seat back 158. Wheels 160 are provided on one end of the frame 152 to facilitate moving the chair. Wheels 160 may be removed from both sides of the frame 152, if desired.

Figure 23:
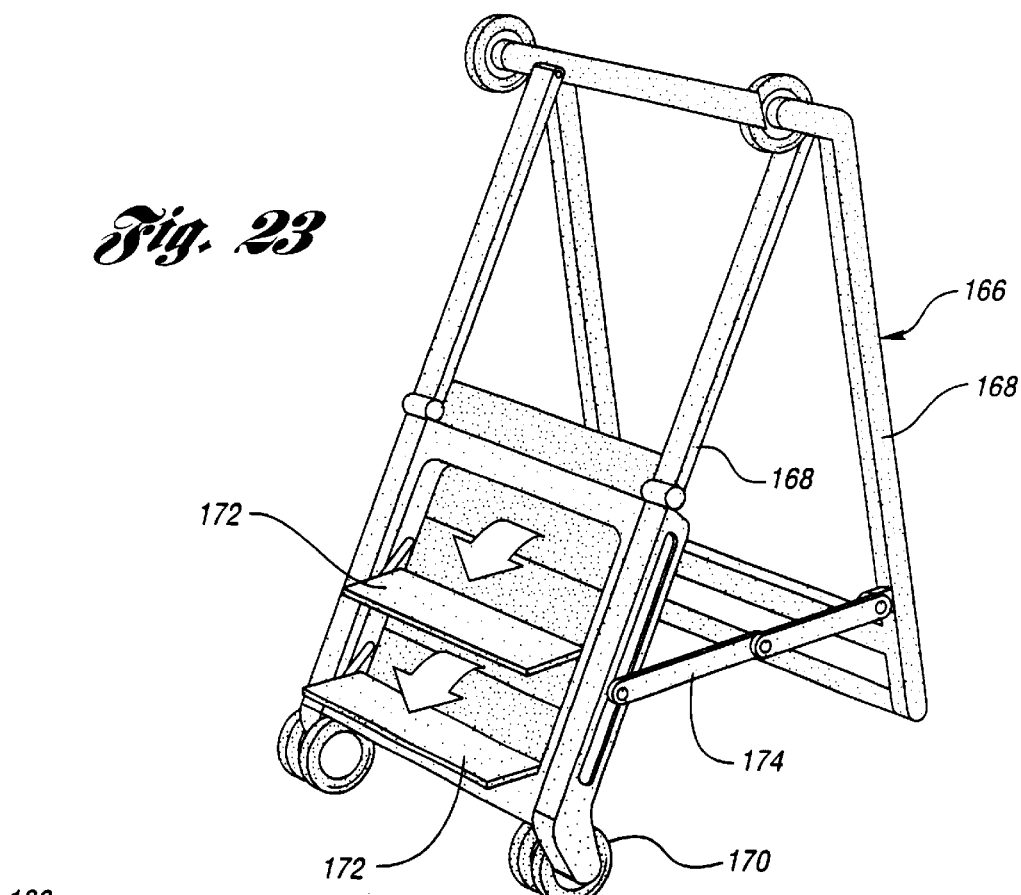
FIG. 23 is a perspective view of a collapsible cart configured to form a step ladder.

Referring now to FIG. 23, a collapsible step ladder 166 may be provided that includes an A-frame 168. Wheels 170 are provided on the front portion at the lower end of the A-frame 168. Steps 172 may be folded out to provide a small step ladder. Supports 174 interconnect the two ends of the A-frame 168 to stabilize it.

Figure 24:
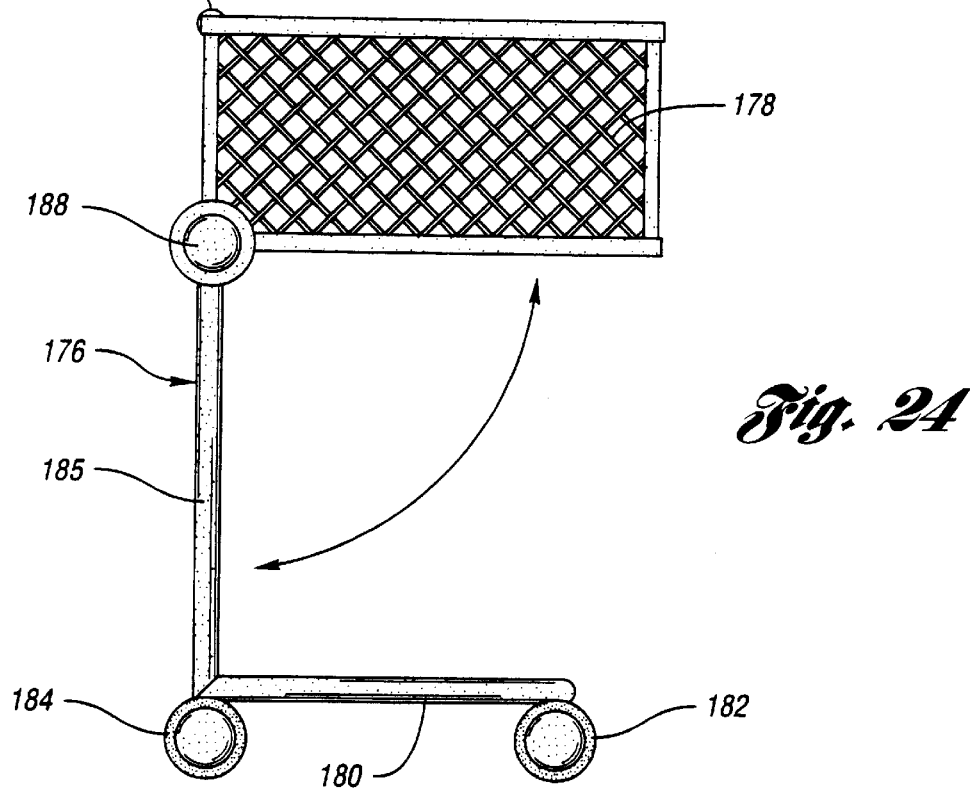
FIG. 24 is a side view of a collapsible cart in a grocery cart configuration.

Referring now to FIGS. 24 and 25, a shopping cart embodiment 176 is illustrated wherein a shopping cart-type basket 178 is supported on a base frame 180 that is provided with front wheels 182 and rear wheels 184. A rear frame 185 extends vertically upwardly from the base frame 180 to the basket 178. A handle 186 is secured to the top edge of the basket 178. The basket 178 is connected to the rear frame 185 by means of a pivot joint/wheel 188. The basket may be pivoted as shown by the arcuate arrow in FIG. 24 into the position shown in FIG. 25 by rotating the basket 178 about the pivot joint/wheel 188. In this way, a low profile basket 178 can be provided.

Referring now to FIGS. 26 and 27, the construction of one embodiment of the bin 18 is shown in exploded perspective. A bin shell 190 is lined by a bin body 192. A lid panel 50 is connected to the bin body 192 by means of a hinge 194. As previously described, the front of the bin body has a net cover 54 that is connected by hinge 56 to the front of the bin body 192.

Referring now to FIGS. 28–31, a fold out trunk storage bin 196 is shown in the rear portion of a conventional trunk. The fold out trunk storage bin 196 includes a base wall 198 and front wall 200 that are hinged together to provide the fold out storage bin. A rear support wall 204 is provided inside the rear wall of the vehicle trunk. Net end walls 202 may be provided at the ends of walls 198, 200 and 202. Additional net dividers may be provided at spaced intervals across the width of the fold out trunk storage bin 196. Net dividers can be positioned on the rear wall 204 as desired in the locators 206 that are provided on the top of the rear wall 204.

Referring now to FIG. 29, the fold out trunk storage bin 196 is shown in its folded position in which it requires a minimum amount of space within the trunk.

Referring to FIG. 30, the fold out trunk storage bin 196 is opened by folding the base wall 198 and front wall 200 down to the floor of the trunk. The front wall 200 is then folded up into a perpendicular position relative to the base wall 198.

Referring to FIG. 31, the net end walls 202 enclose lateral ends of the base wall 198, rear wall 204, and the front wall 200.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle storage system comprising:
    a vehicle storage compartment defining a space for storing a variety of different articles, and having a load floor formed in one or more sections;
    said vehicle storage compartment including a storage well that may be covered by the load floor;
    a tray contained within the storage well and having a plurality of compartments defined thereby; and
    a pivot connection between the storage well and the tray that permits the tray to rotate within the well to facilitate access to any of the plurality of compartments.

2. A vehicle storage system comprising:
    a vehicle storage compartment defining a space for storing a variety of different articles, and having a load floor formed in one or more sections;
    a frame formed of vertically oriented support rails, horizontal lateral rails and horizontal longitudinal rails;
    a storage module alternatively received on the load floor or supported above the load floor on the frame.

3. The vehicle storage system of claim 2 wherein the storage module is a removable tray.

4. The vehicle storage system of claim 2 wherein the storage module is a bin.

5. The vehicle storage system of claim 2 further including a storage well covered by the load floor;
    a tray contained within the storage well and having a plurality of compartments defined thereby; and
    a pivot connection between the storage well and the tray that permits the tray to rotate within the well to facilitate access to any of the plurality of compartments.

* * * * *